Aug. 28, 1962 — A. A. SHAMES — 3,051,094
COLLAPSIBLE MONORAIL TRACK
Filed Sept. 10, 1957 — 3 Sheets-Sheet 1

INVENTOR
*Albert A. Shames*
BY
*W. J. Eccleston*
ATTORNEY

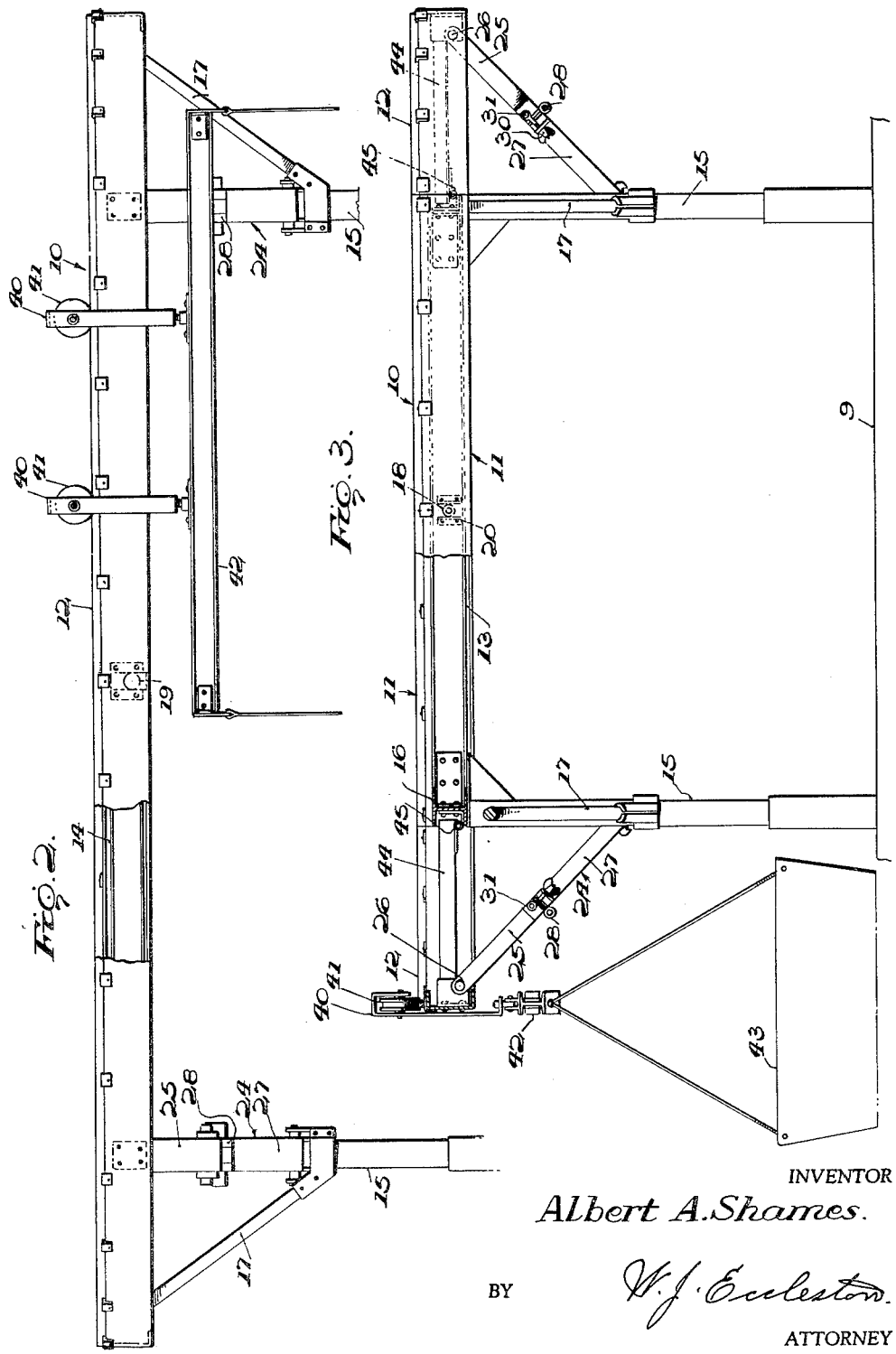

Aug. 28, 1962  A. A. SHAMES  3,051,094
COLLAPSIBLE MONORAIL TRACK
Filed Sept. 10, 1957  3 Sheets-Sheet 3
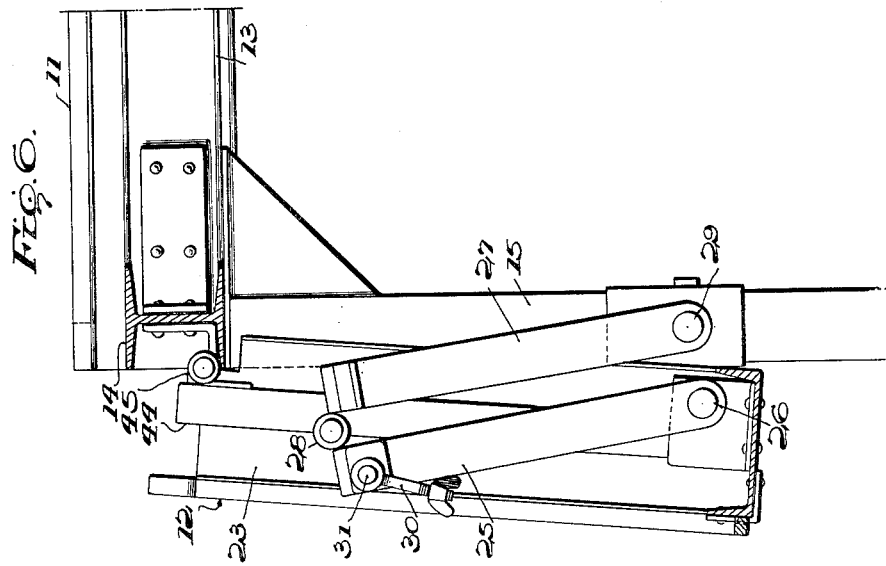
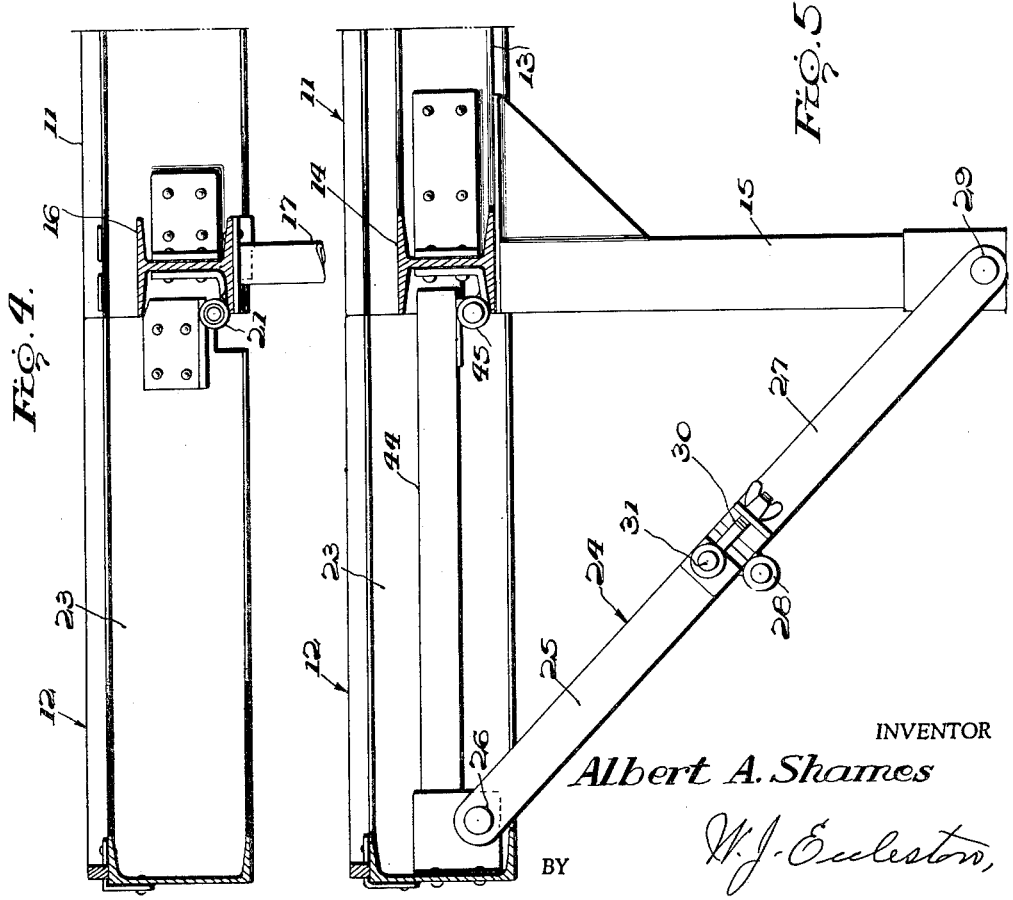
INVENTOR
*Albert A. Shames*
BY *W. J. Eccleston,*
ATTORNEY

United States Patent Office 3,051,094
Patented Aug. 28, 1962

3,051,094
COLLAPSIBLE MONORAIL TRACK
Albert A. Shames, Waban, Mass., assignor to the United States of America as represented by the Secretary of the Army
Filed Sept. 10, 1957, Ser. No. 683,188
4 Claims. (Cl. 104—126)

The invention relates to work platforms or areas wherein a plurality of different machines are arranged about the periphery of the area or platform in outwardly facing directions and to closed tracks extending around the periphery of the platform or area for transporting work pieces or the like from machine to machine. More particularly, the invention relates to a mobile work platform such as a vehicle and to an overhead, monorail track.

Mobile work shops are well known and are widely used, for instance, during wartime for manufacture or repair in proximity to the front lines. Such shops are limited as to width, at least while traveling, to the normal width of the vehicle whereby to permit the travel of the vehicle along highways. Moreover, it is impractical to expand such a vehicle when it is not traveling as the various machines mounted thereon must be fixed in position within the limits of the floor or platform of the vehicle.

However, the size of the vehicle floor or platform can be expanded while the vehicle is at rest by the use of side and end extensions and even by utilizing the surrounding ground when the vehicle platform is low enough. Moreover, where the work pieces to be operated upon are of substantial size and weight, it is desirable to provide the platform with some means for transporting work pieces from machine to machine for successive operations.

In the usual mobile shop, the machines are disposed along one or both sides of the vehicle facing inwardly towards a centrally disposed aisle. This arrangement materially restricts the available standing room for the operators and limits the means or track for transporting work pieces to a single track extending longitudinally of the vehicle. In the patent of Herman B. Levitz and James M. Dunston, Patent No. 2,811,111, dated October 29, 1957, a more desirable arrangement is disclosed wherein the machines face outwardly of the platform in different directions in combination with a closed track extending around the platform for transporting work pieces from machine to machine. It is with an improvement of the arrangement there disclosed that the track of the hereinafter described invention is specifically directed.

Obviously, a fixed closed track would have to be confined within at least the side limits of the fixed platform whereby to require the machines to be located well inwardly of the sides and thus, materially reduce the usable area of the platform, so the present invention relates to extensible and collapsible tracks.

With the foregoing in view, it is an object of the invention to provide in combination with such a platform or area, a closed track which is collapsible from an operative position wherein the track is disposed well outwardly of the sides of the platform to an inoperative or traveling position wherein the track width is reduced to conform substantially to the width of the platform.

A further object is to provide such a track which is of the overhead monorail type.

A further object is to provide a closed track which is collapsible to and from extended operative positions and collapsed inoperative positions.

A further object is to provide such a track which comprises two fixed track sections and two movable track sections, and hinge means mounting said movable sections for swinging movement to and from the extended and collapsed positions.

Other objects and advantages reside in the particular structure of the invention, the structure of the several elements forming the same, combinations and sub-combinations of such elements, all of which will be readily apparent to those skilled in the art upon reference to the attached drawing and to the following specification wherein the invention is shown, described and claimed.

In the drawing:

FIGURE 2 is a side elevation of the track, parts being partly broken away;

FIGURE 3 is a transverse, vertical sectional view taken substantially on the planes of the line 3—3 of FIGURE 1;

Figure 1:
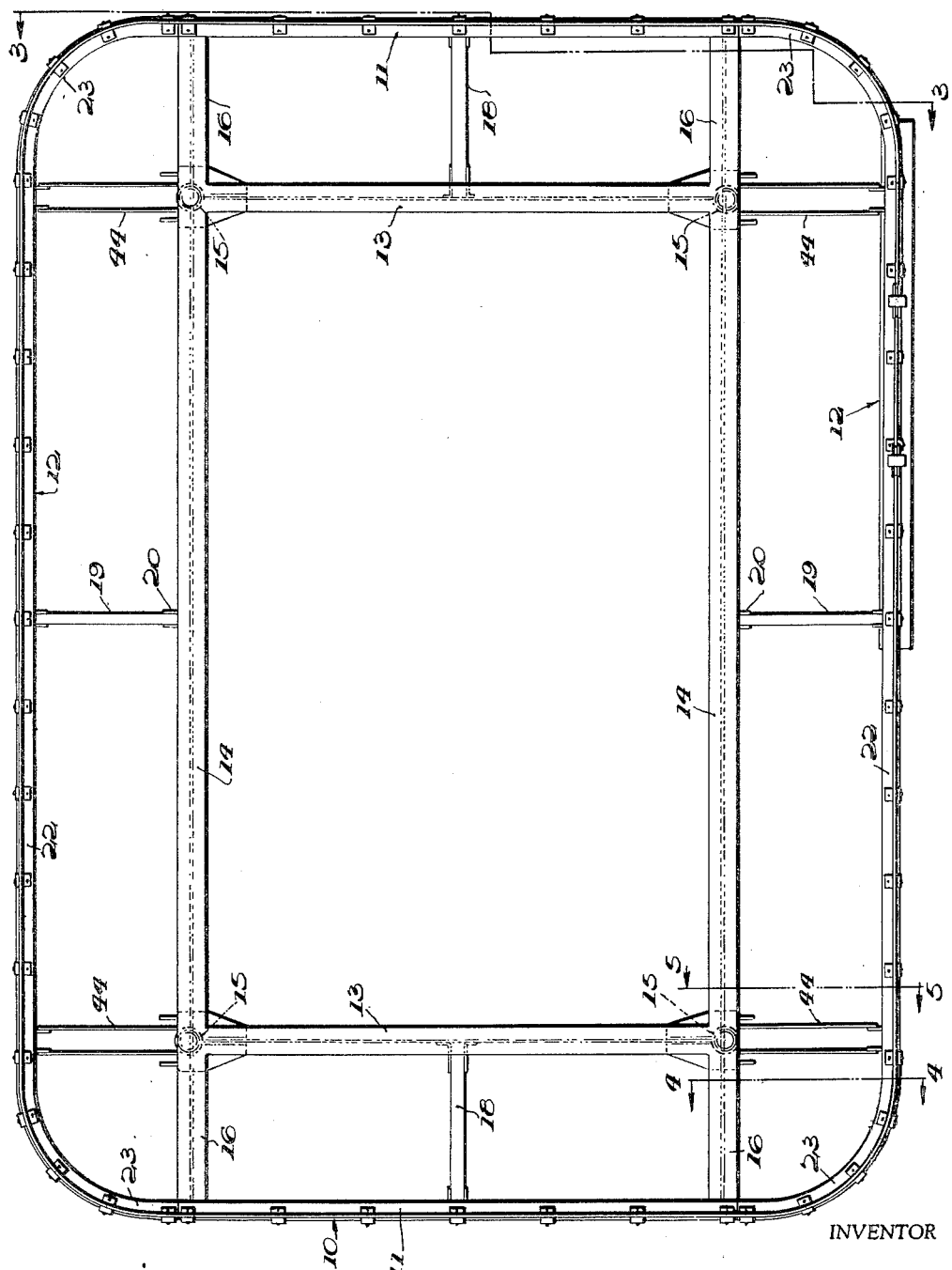
FIGURE 1 is a plan view of the track apart from the machinery and showing the track in the extended position.

FIGURES 4 and 5 are enlarged, fragmentary, vertical sectional views taken respectively on the planes of the lines 4—4 and 5—5 of FIGURE 1; and FIGURE 6 is a view like FIGURE 5 but showing the movable track section in the collapsed or traveling position.

Referring specifically to the drawing, wherein like reference characters have been used throughout the several views to designate like parts, 10 designates generally the closed, endless, overhead monorail track according to the invention. Such track 10, comprises a pair of fixed, transverse end track sections 11 and a pair of movable, longitudinal side track sections 12. The four track sections 11, 11 and 12, 12 are supported by a fixed frame which may comprise any suitable structure such as the transverse end frame members 13, 13 and the longitudinal side frame members 14, 14. The frame members 13 and 14 are fixedly connected together by any suitable means and are supported above a work platform 9 (FIG. 3), by any suitable means such as the corner posts 15. In the embodiment illustrated, the end rails or track sections 11 are supported in outwardly spaced parallel relation to the end frame members 13 by extensions 16 of the side frame members 14. Likewise, the end track sections 11 are braced by fixed struts 17, 18. There are four fixed struts 17, one extending diagonally upwardly to an end section 11 from each supporting post 15. The struts 18 are at least two in number and each connects an end track section to an end frame member 13. They are disposed parallel with the side frame extensions 16 intermediate the same. Obviously more struts 18 may be used if necessary. In a similar manner the intermediate portions of each movable track section 12 may be braced by a horizontal strut 19 which has an outer end fixed to the track section 12 and an inner end which is hinged to the adjacent side frame member 14 by any suitable hinge means 20. Additional horizontal struts or braces 44 comprise lateral extensions of the end frame members 13. The inner ends of the struts 44 are hinged to the side frame members 14 by any suitable hinge means 45. The outer ends of such struts 44 are fixedly connected to the side track sections 12 in any suitable manner.

In addition to the hinges 20 and 45 the side track sections 12 are hinged to the side frame extension 16 by any suitable hinge means 21, FIGURE 4, which are axially aligned with the hinges 20 and 45. As best seen in FIGURE 1, each side track section 12 is in the form of an elongated U-shaped structure having a web 22 and arcuate legs 23 the free ends of which mount the hinges 21 aforesaid. The free ends of the legs 23 abut the opposite ends of the track sections 11 to form an endless track when the side sections 12 are in the operative position of FIGURE 1. To secure the side sections 12 in the operative position, there has been provided a number of collapsible braces or struts 24, best seen in FIGURES 5 and 6. These collapsible struts 24 may be of any suitable structure, but in the embodiment illustrated correspond to those described and claimed in my copending application Serial No. 603,463, filed August 10, 1956, now abandoned. Briefly, each brace or strut 24 comprises an upper section 25 hinged to the web 22 of a side section 12 at or near the juncture with a leg 23 by any suitable hinge means 26. Each upper strut section 24 is hinged to a lower strut section 27 by any suitable hinge 28. The lower end of each lower strut section 27 is hinged to a post 15 by any suitable hinge means 29. The hinge means 26, 28, and 29 are, of course, parallel. Suitable means 30, as described in my copending application aforesaid, is provided to lock the collapsible struts 24 in the operative position of FIGURES 3 and 5. When the lock or latch means 30 is loosened, it may be swung upwardly on its own hinge means 31 to a released position, which permits the strut 24 to be collapsed by the exertion of pressure on the center hinge means 28 in a diagonally upwardly direction in a manner readily understood.

It is to be understood that as the struts 24 are collapsed, the side track sections 12 are automatically lowered to the inoperative or traveling position illustrated in FIGURE 6. When in this position, it is understood that the outer limits of the collapsed side sections 12 are substantially coplanar with the maximum outer limits of the vehicle on which the assembly is mounted. Any suitable securing means, not shown, may be used to fasten the track sections 12 in the traveling position. On the other hand, when the side sections 12 are raised to the operative position of FIGURE 1 and locked in such positions, such side sections extend well beyond the planes defining the opposite sides of the vehicle. In like manner, it is understood that the end track sections 11 may extend beyond the ends of the vehicle mounting the assembly. Thus, with the track sections in the operative position, there has been provided a collapsible monorail track which extends entirely around the vehicle outwardly thereof. When in such position, the track 10 carries thereon any suitable trucks 40 having wheels 41 which mount there below a suitable carriage 42. Carriage 42 may support any suitable work piece, such as the receptacle 43, FIGURE 3.

It is apparent from the foregoing that the collapsible track shown and described hereinbefore is readily collapsed to the traveling position by merely unlocking and collapsing the collapsible struts 24. Prior to this, of course, the trucks 40 and carriage 42, together with the receptacle or work piece 43, may be moved to one of the rigid end track sections 11, or otherwise disposed of. Thus, the structure shown and described clearly provides a device which is readily operated from the traveling position to the operative position without sacrificing any work space on the vehicle.

Likewise, while there has been shown and described what is now thought to be a preferred embodiment of the invention, it should be understood that the same is susceptible of other forms and expressions. Consequently, the invention is not considered as being limited to the precise structure shown and described hereinabove except as hereinafter claimed.

I claim:

1. In a mobile work platform, including a fixed support having two opposite sides as well as front and rear ends; the improvement comprising a pair of fixed track sections, means mounting said fixed track sections in horizontal coplanar relation axially outwardly of said ends of said support in transverse relation to the same, said fixed track sections having opposite ends, a pair of substantially U-shaped movable track sections each comprising a pair of spaced legs having inner and outer ends and a web portion connecting said outer ends of said legs together, hinge means hingedly connecting said inner ends of said legs to said opposite ends of said fixed track sections, struts fixed to said outer ends of said legs of said movable track sections outwardly of said inner ends, hinge means hingedly connecting said struts to said support, said hinge means of each movable track section and its struts having aligned axes, said movable track sections being swingable on said hinge means from operative positions in coplanar relation with said fixed track sections with said inner ends of said movable track sections abutting said opposite ends of said fixed track sections and with said web portions laterally outwardly of said opposite sides of said support to substantially vertical inoperative positions, and means readily releasably supporting said movable track sections in said operative positions.

2. In a mobile work platform, including a fixed support having two opposite sides as well as front and rear ends; the improvement comprising a pair of fixed track sections, means mounting said fixed track sections in horizontal coplanar relation axially outwardly of said opposite ends of said support and transversely of the same above said platform, said fixed track sections having opposite ends, a pair of substantially U-shaped movable track sections each comprising a pair of curved legs having inner and outer ends and a web portion connecting said outer ends together, hinge means hingedly connecting said inner ends of said legs to said opposite ends of said fixed track sections, struts fixed to said outer ends of said legs, hinge means hingedly connecting said struts to said support, said hinge means of each movable track section and its struts having aligned axes, said movable track sections being swingable on said hinge means from operative positions in coplanar relation with said fixed track sections with said inner ends of said movable track sections in abutting relation with said opposite ends of said fixed track sections and with said web portions laterally outwardly of said opposite sides of said support to inoperative vertical positions, and means readily releasably supporting said movable track sections in said operative positions.

3. A mobile work platform according to claim 2, wherein said struts and said outer ends of said legs of said movable track sections are substantially aligned with said opposite ends of said support.

4. A mobile work platform according to claim 3, wherein said web portion of each of said movable sections includes at least one fixed strut, and hinge means hingedly connecting said last named strut to said support, each last named hinge means having an axis aligned with said axes of its associated hinge means.

References Cited in the file of this patent

UNITED STATES PATENTS

| | | |
|---|---|---|
| 540,866 | Mally | June 11, 1895 |
| 1,531,075 | Clubine | Mar. 24, 1925 |
| 1,776,262 | Noir et al. | Sept. 23, 1930 |
| 2,088,122 | Taylor | July 27, 1937 |
| 2,358,446 | Couse | Sept. 19, 1944 |
| 2,634,462 | Graven | Apr. 14, 1953 |
| 2,811,111 | Levitz et al. | Oct. 29, 1957 |
| 2,817,300 | Shutt | Dec. 24, 1957 |